US009785225B2

(12) United States Patent
Myrberg et al.

(10) Patent No.: US 9,785,225 B2
(45) Date of Patent: *Oct. 10, 2017

(54) ENERGY MANAGEMENT BY DYNAMIC FUNCTIONALITY PARTITIONING

(71) Applicant: Microsoft Technology Licensing, LLC, Redmond, WA (US)

(72) Inventors: Mats Eric Myrberg, Seattle, WA (US); Gerald Reuben DeJean, II, Redmond, WA (US); Lance Eric Greenwade, Carnation, WA (US); Marc Tremblay, Clyde Hill, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/801,490

(22) Filed: Jul. 16, 2015

(65) Prior Publication Data

US 2015/0323980 A1    Nov. 12, 2015

Related U.S. Application Data

(63) Continuation of application No. 13/655,470, filed on Oct. 19, 2012, now Pat. No. 9,110,670.

(51) Int. Cl.
*G06F 1/32* (2006.01)
*G05B 15/02* (2006.01)
(Continued)

(52) U.S. Cl.
CPC .......... *G06F 1/3287* (2013.01); *G05B 15/02* (2013.01); *G06F 9/5094* (2013.01);
(Continued)

(58) Field of Classification Search
CPC .. G06F 1/3287; G06F 9/5094; G06F 11/3058; G06F 15/7889; H04N 19/12;
(Continued)

(56) References Cited

U.S. PATENT DOCUMENTS 6,362,836 B1    3/2002    Shaw et al.
6,859,831 B1    2/2005    Gelvin et al.
(Continued)

FOREIGN PATENT DOCUMENTS

CN    101009623    8/2007
CN    101156449    4/2008
(Continued)

OTHER PUBLICATIONS

Chinese Office Action dated Jul. 27, 2016 for Chinese Patent Application 201380054344.4, a counterpart foreign application of now U.S. Pat. No. 9,110,670.
(Continued)

*Primary Examiner* — Mark Connolly
(74) *Attorney, Agent, or Firm* — Jacob P. Rohwer; Newport IP, LLC

(57) ABSTRACT

A sensor and processing system dynamically partitions or allocates functionality between various remote sensor nodes and a processing subsystem based on energy management management considerations. Redundant functionality is located at the processing subsystem and each of the various remote sensor nodes, and each sensor node coordinates with the processing subsystem to determine the location (e.g., at the processing subsystem or at the sensor node) at which a particular functionality is executed.

20 Claims, 6 Drawing Sheets

(51) Int. Cl.
*H04N 19/12* (2014.01)
*H04N 19/127* (2014.01)
*H04N 19/156* (2014.01)
*G06F 11/30* (2006.01)
*G06F 9/50* (2006.01)

(52) U.S. Cl.
CPC ......... *G06F 11/3058* (2013.01); *H04N 19/12* (2014.11); *H04N 19/127* (2014.11); *H04N 19/156* (2014.11); *Y02B 60/1282* (2013.01); *Y02B 60/142* (2013.01); *Y04S 20/40* (2013.01)

(58) Field of Classification Search
CPC .... H04N 19/127; H04N 19/156; Y02B 20/40; Y02B 60/1282; Y02B 60/142
See application file for complete search history.

(56) References Cited

U.S. PATENT DOCUMENTS

| | | | |
|---|---|---|---|
| 7,020,701 | B1 | 3/2006 | Gelvin et al. |
| 7,463,968 | B2 | 12/2008 | Snyder |
| 7,887,235 | B2 | 2/2011 | Campos et al. |
| 7,921,312 | B1 | 4/2011 | Pennanen et al. |
| 7,953,283 | B2 * | 5/2011 | Inoue ............... H04N 7/147 382/233 |
| 8,171,317 | B2 * | 5/2012 | Wang ............... G06F 1/3203 370/311 |
| 8,208,402 | B2 * | 6/2012 | Fischer ............. H04W 8/245 370/254 |
| 8,671,302 | B2 * | 3/2014 | Manapragada ...... H04L 7/08 370/328 |
| 2002/0181501 | A1 | 12/2002 | Nova et al. |
| 2004/0203708 | A1 | 10/2004 | Khan et al. |
| 2004/0243859 | A1 | 12/2004 | Mueller et al. |
| 2005/0120128 | A1 | 6/2005 | Willes et al. |
| 2005/0198214 | A1 | 9/2005 | Inoue |
| 2005/0234846 | A1 | 10/2005 | Davidson et al. |
| 2006/0072014 | A1 | 4/2006 | Geng et al. |
| 2006/0085534 | A1 | 4/2006 | Ralston et al. |
| 2007/0236345 | A1 | 10/2007 | Yu et al. |
| 2008/0235519 | A1 | 9/2008 | Onouchi et al. |
| 2009/0033155 | A1 | 2/2009 | Kanno et al. |
| 2009/0061954 | A1 | 3/2009 | Syed |
| 2010/0005483 | A1 | 1/2010 | Rao |
| 2010/0027808 | A1 | 2/2010 | Hamada et al. |
| 2010/0114826 | A1 | 5/2010 | Voutilainen et al. |
| 2010/0183153 | A1 | 7/2010 | Cho et al. |
| 2010/0256914 | A1 | 10/2010 | Hutin et al. |
| 2010/0330927 | A1 | 12/2010 | Cherukuri et al. |
| 2011/0035491 | A1 | 2/2011 | Gelvin et al. |
| 2011/0119045 | A1 | 5/2011 | Durand et al. |
| 2011/0134832 | A1 | 6/2011 | Soliman |
| 2011/0283235 | A1 | 11/2011 | Kling et al. |
| 2012/0047378 | A1 * | 2/2012 | Etkin ............... H04W 52/0219 713/320 |
| 2012/0272086 | A1 | 10/2012 | Anderson et al. |
| 2013/0238912 | A1 | 9/2013 | Priel et al. |
| 2014/0086121 | A1 | 3/2014 | Emeott et al. |
| 2014/0115128 | A1 | 4/2014 | Myrberg et al. |
| 2014/0115366 | A1 | 4/2014 | Joo et al. |
| 2014/0115372 | A1 | 4/2014 | Myrberg et al. |

FOREIGN PATENT DOCUMENTS

| | | |
|---|---|---|
| CN | 102186259 | 9/2011 |
| CN | 102695295 | 9/2012 |
| WO | WO2006/080261 | 8/2006 |

OTHER PUBLICATIONS

Extended European Search Report dated Apr. 26, 2016 for European Patent Application No. 13786068.0, 8 pages.

Amazon Silk Revolutionary Cloud-Accelerated Split Browser>>, Retrieved at <<http://www.amazon.com/Kindle-Color-Multi-touch-Display-Wi-Fi/dp/Boo51VV0B2/r>>Retrieved Date on Dec. 9, 2011, pp. 11.

Bhattacharjee et al., "Full-System Chip Multiprocessor Power Evaluations Using FPGA-Based Emulation", Retrieved at <<http://ieeexplore.ieee.org/stamp/stamp.jsp?tp=&arnumber=5529025>>, Low Power Electronics and Design (ISLPED), 2008 ACM/IEEE , Aug. 8, 2008, pp. 335-340.

Chun et al., "Dynamically Partitioning Applications between Weak Devices and Clouds", Retrieved at <<http://berkeley.intel-research.net/bgchun/dynamic-partitioning-mcs10.pdf>>, MCS Jun. 15, 2010, San Francisco, CA, USA, Jun. 15, 2010, pp. 5.

"Foxton Technology", retrieved on Apr. 12, 2012, at <<http://en.wikipedia.org/wiki/Foxton Technology>>, Wikipedia. 2 pages.

FPGA Power Management and Modeling Techniques, Retrieved at <<http://www.altera.com/literature/wp/wp-01044.pdf>>, Dec. 2010, pp. 9.

Hill et al., "A wireless embedded sensor architecture for system-level optimization", retrieved on Oct. 2002 at <<http://citeseer.ist.psu.edu/viewdoc/download;jsessionid=8A50DC11D9C55595975225DB104D8DF7?doi=10.1.1.12.6612&rep=rep1&type=pdf>>, ece, UC Berkeley, 21 pages.

Intel Turbo Boost Technology—On Demand Processor Performance, Retrieved at <<http://www.intel.com/content/www/us/en/architecture-and-technology/turbo-boost/turbo-boost-technology.html>>, Retrieved Date: Apr. 13, 2012, pp. 2.

Newton et al., "Wishbone: Profile-based Partitioning for Sensornet Applications", Retrieved at <<http://www.usenix.org/event/nsdi09/tech/full_papers/newton/newton.pdf>>, NSDI '09: 6th USENIX Symposium on Networked Systems Design and Implementation, Apr. 2009, pp. 395-408.

Office Action for U.S. Appl. No. 13/655,472, dated Dec. 11, 2014, "Dynamic Functionality Partitioning", Myrberg et al., 32 pages.

PCT Search Report and Written Opinion dated Aug. 4, 2014 for PCT Application No. PCT/US2013/065733, 9 Pages.

PCT Search Report and Written Opinion dated Sep. 25, 2014 for PCT Application No. PCT/US2013/065726, 10 Pages.

Power Management Resource Center, Retrieved at <<http://www.altera.com/support/devices/power/pow-power.html>>, Jan. 1, 2010, pp. 6.

Office action for U.S. Appl. No. 13/655,472, dated Nov. 24, 2015, Myrberg et al., "Dynamic Functionality Partitioning", 20 pages.

PCT International Preliminary Report on Patentability dated Feb. 24, 2015 for PCT Application No. PCT/US2013/065733, 8 Pages.

"Second Office Action Issued in Chinese Patent Application No. 201380054344.4", dated Mar. 15, 2017, 9 Pages.

* cited by examiner

ENERGY MANAGEMENT BY DYNAMIC FUNCTIONALITY PARTITIONING

CROSS-REFERENCE TO RELATED APPLICATIONS

This application claims priority to and is a continuation of U.S. patent application Ser. No. 13/655,470, filed on Oct. 19, 2012, which is related to U.S. patent application Ser. No. 13/655,472, entitled "Dynamic Functionality Partitioning" filed Oct. 19, 2012, which is specifically incorporated herein by reference for all that it discloses and teaches.

BACKGROUND

Microelectronic circuitry continues to implement increasingly complex functionality. In many implementations, dedicated microelectronic circuitry is employed to form a particular configuration of dedicated sensor nodes and primary processors (e.g., sensors that are wirelessly (or through wires) coupled to one or more processing units). However, environmental conditions can make that particular configuration sub-optimal during operation. For example, the power and communication bandwidth available to remote sensors may be different (e.g., more power but less bandwidth) in a given scenario than that envisioned in the original design. As such, a system including such remote sensors may perform better in the operating environment if the functionality between the remote sensors and a data processing subsystem had been better optimized for the available power, the thermal environment, and the communication capabilities (e.g., to decrease data processing at the remote sensor nodes and to increase the data preprocessing at the processing subsystem). Furthermore, these factors change over time, so no static design will address all operational circumstances. Existing systems do not provide for dynamic partitioning of functionality between a data processing subsystem and one or more remote sensors.

SUMMARY

Implementations described and claimed herein address the foregoing problems by providing a system that dynamically partitions or allocates the functionality between various remote sensor nodes and a processing subsystem based on energy management considerations, such as power consumption, energy consumption, thermal generation, or energy generation. Redundant functionality is located at the processing subsystem and each of the various remote sensor nodes, and each sensor node coordinates with the processing subsystem to determine the location (e.g., at the processing subsystem or at the sensor node) at which a particular functionality is executed.

This Summary is provided to introduce in a simplified form a selection of concepts that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

In one example environment, multiple sensor nodes are distributed throughout the environment, reporting sensed data to a processing subsystem. For example, traffic cameras may be distributed throughout an urban center, transmitting streamed video or static images to a traffic center for use in monitoring vehicle flow and commuter conditions in the city. The traffic center may use such traffic information to adjust traffic signal frequencies, deploy emergency personnel, etc. The traffic center may also provide such traffic information via a traffic website or television broadcast. It should understood, however, that other types of sensor nodes and processing subsystems may also be employed within the scope of the described technology, including without limitation cameras and microphones in a console gaming environment, chemical detectors in a manufacturing environment, microphones and infrared cameras in a security environment, pressure sensors in a pumping station, etc.

A system implementation disclosed herein includes multiple sensor nodes and a processing subsystem that processes the sensor data from the sensor nodes. Such systems may be configured to distribute sensor nodes in a variety of remote energy management conditions that can impact the way in which each sensor node performs. In an example implementation, where the sensor nodes and/or processing subsystem are operating with varying energy management conditions, the operational capabilities of the sensor nodes and/or the processing subsystem may be diminished or enhanced by these factors. Example energy management conditions may include without limitation power consumption, energy consumption, thermal generation, or energy generation. It should be understood that energy may include electrical energy, thermal energy, acoustic energy, motive energy, and other types of energy. For example, specific energy management condition may refer to the amount of energy (e.g., in Watt-Hours) available to power the sensor units.

To account for this variability in operational capabilities caused by energy management factors, a sensor node may vary the amount of preprocessing it performs on the sensor data prior to transmitting the sensor data to the processing subsystem and/or the processing subsystem may vary the amount of preprocessing it performs on received sensor data prior to passing the sensor data to its own CPU. In one implementation, both the sensor nodes and the processing subsystem employ complimentary preprocessing functionality that can be dynamically allocated between the processing subsystem and individual sensor nodes. Depending on the available energy management conditions, the system may choose to do more or less preprocessing of the sensor data on the sensor nodes themselves, thus adjusting the power consumption, energy consumption, energy detection, thermal generation, energy generation, etc. at any given time.

Figure 1:
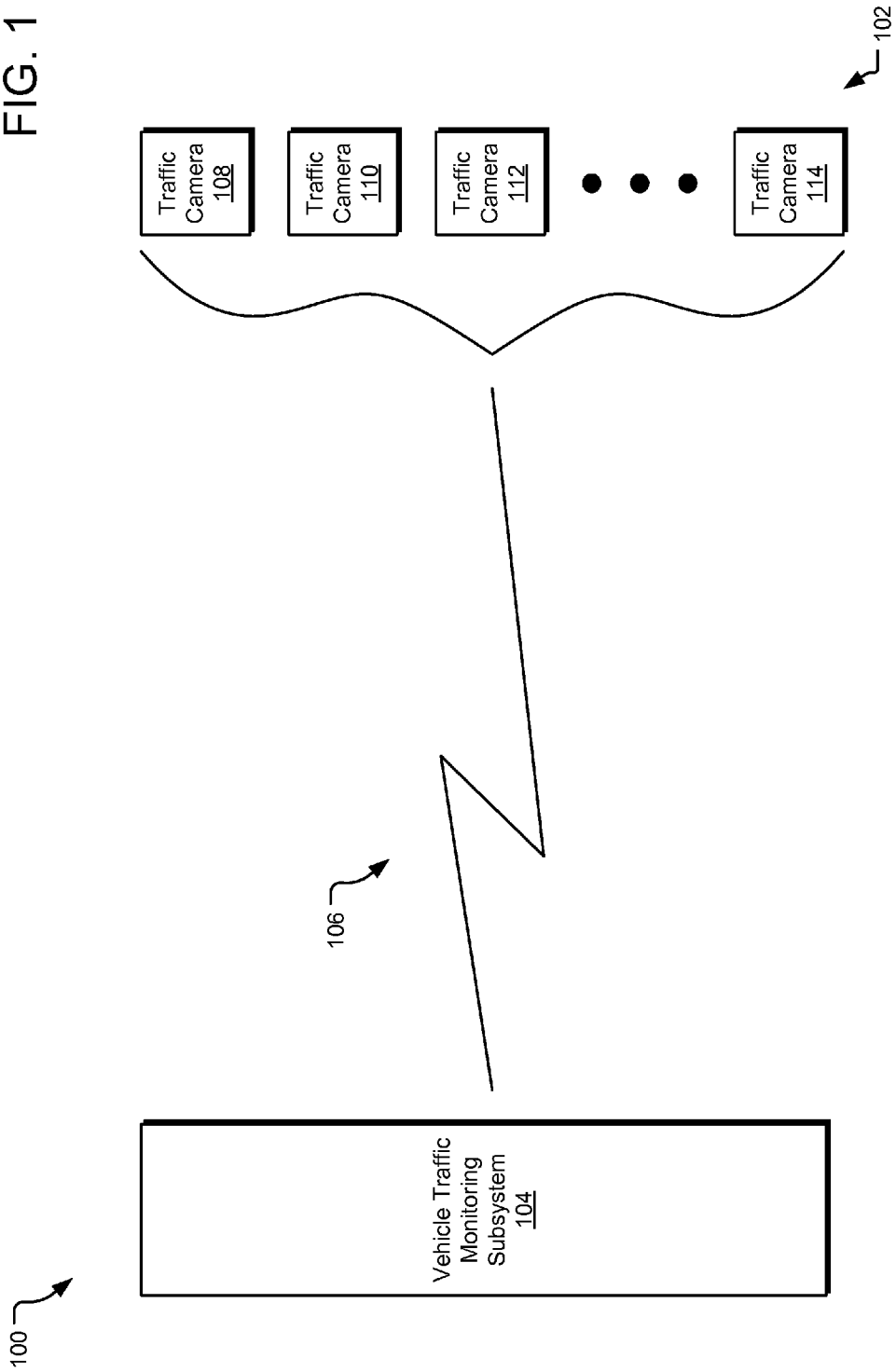
FIG. 1 illustrates an example system of sensor nodes and a processing subsystem employing dynamic functionality partitioning.

FIG. 1 illustrates an example system 100 of sensor nodes (e.g., traffic cameras 102) and a processing subsystem (e.g., a vehicle traffic monitoring subsystem 104) employing dynamic functionality partitioning. In FIG. 1, the system 100 is depicted and described with regard to a traffic monitoring system, although such systems may be employed in other applications, including security monitoring, chemical processing monitoring, weather monitoring, gaming, medical treatment, etc.

In the illustrated example, the vehicle traffic monitoring subsystem 104 operates to receive and process sensor data received from the various traffic cameras 102. The communications channel (illustrated by wireless connection 106) may be wired (including digital or analog signaling) or wireless (including radio-frequency or optical signaling), depending on the system needs. In some implementations, the communications channel for one sensor node may be wireless while the communications channel for another sensor node may be wired. Accordingly, the dynamic partitioning for any individual sensor node may be independent of the dynamic partitioning for another individual sensor node. Nevertheless, this feature does not preclude the interaction between or among individual sensor nodes, as described below in more detail.

Although the vehicle traffic monitoring subsystem 104 and the traffic cameras 102 may be implemented by discrete components, a technology that can contribute to dynamic functionality partitioning is referred to as a system-on-a-chip (SOC) in which most or all components of a sensor node are integrated into an integrated circuit (IC) that may contain without limitation digital, analog, mixed-signal, optical, radio-frequency, central processing units, preprocessors, and memory components. By integrating such sensor components with individual preprocessors (e.g., image and video preprocessing accelerators, voice/audio preprocessors, digital signal processors (DSPs), communication monitors, power monitors, motion detectors, etc.) and other components, an individual sensor node may provide a wide selection of functionality, which, depending on the energy management context, may be executed by the sensor node or offloaded to the vehicle traffic monitoring 104. The described technology can dynamically adjust the allocation of such functionality between and among such devices.

In one example, the traffic cameras 102 are monitoring vehicle traffic throughout an urban center and transmitting video data back to the vehicle traffic monitoring subsystem 104 for review by traffic controllers, television and radio news personnel, etc. The energy management conditions for the vehicle traffic monitoring subsystem 104 and various traffic cameras 102 may differ significantly. For example, a traffic camera located in the shade at one intersection may perform better than another traffic camera located in the hot afternoon sun. Likewise, a battery-powered traffic camera may perform differently (in order to preserve power) than a traffic camera that is connected to a city's electrical grid. These energy management factors may be accommodated by dynamic partitioning of various preprocessing functions at the sensor node, including compression, noise cancelling, smoothing, spatial normalization, etc., to increase or decrease the power draw or thermal generation of an individual sensor node at any particular point in time. Likewise, the energy management factors may also influence the dynamic partitioning of various preprocessing functions at a processing subsystem. For example, if the processing subsystem is in the form of a mobile computer, it may allocate certain preprocessing functionality to the traffic camera while it is on battery power and regain that preprocessing functionality once it is plugged into the power grid again.

As a further illustration, assume the traffic cameras 108, 110, 112, and 114 are distributed at different intersections in the urban center. Each traffic camera is initially configured to transmit its video to the vehicle traffic monitoring subsystem 104 in a compressed format. If the traffic camera 108 detects a low battery, a diminished power draw, excessive thermal conditions, or other energy management problems, the traffic camera 108 can disable one or more of its preprocessing accelerators that compress the video stream so as to reduce its power consumption, thermal generation, etc. Examples of compression may include lossless compression, lossy compression, spatial image compression, temporal motion compensation, etc. In such a modified operational mode, the traffic camera 108 transmits raw video data, rather than compressed video data, to the vehicle traffic monitoring subsystem 104, so that the compression formatting is performed by a preprocessing block at the vehicle traffic monitoring subsystem 104, instead of at the traffic camera 108.

For example, the traffic camera 108 may be located at a busy intersection. In response to detection of a robust power supply and/or cool operating temperatures, the traffic camera 108 may perform noise cancellation to take advantage of the robust energy management conditions. In contrast, the traffic camera 110 may detect a weak battery and/or excessive temperature (e.g., the camera is located in hot, sunny location), both of which can diminish the operation of the traffic camera. As such, the traffic camera 110 may dynamically disable all of its preprocessors to reduce its power consumption, thermal generation requirements and other energy management requirements until conditions improve (e.g., the battery is recharged or the operating temperature drops). Other factors that may be considered by each traffic camera may include without limitation time of day, date, available bandwidth, parameters specified by the vehicle traffic monitoring subsystem 104, etc. In this context, individual traffic cameras can dynamically select among multiple preprocessors on an individual basis, depending on the image content, available bandwidth, available power, available energy, generated energy, and other factors identified by each traffic camera.

Further, where certain functionality is omitted (via dynamic partitioning) at a sensor node, the functionality may be provided by a complimentary preprocessor at the vehicle traffic monitoring subsystem 104. For example, should the traffic camera 108 omit a noise cancellation function from its preprocessing of the captured video, the vehicle traffic monitoring subsystem 104 may therefore enable noise cancellation preprocessor at its side of the communication channel to improve the video quality. In one implementation, the vehicle traffic monitoring subsystem 104 and individual traffic cameras are in communication about the preprocessing each traffic camera and the vehicle traffic monitoring subsystem 104 are able to provide or are requested to provide. For example, the vehicle traffic monitoring subsystem 104 may detect that it is no longer on battery power but is instead connected to the city's electrical grid. Accordingly, the vehicle traffic monitoring subsystem 104 may signal one or more traffic cameras 102 to disable one of more of their preprocessors, offloading the functionality to the vehicle traffic monitoring subsystem 104. Many other examples of interaction between the vehicle traffic monitoring subsystem 104 and individual traffic cameras are contemplated.

It should also be understood that implementations of the presently described technology may include communicative cooperation among multiple sensor nodes, whether orchestrated between or among peer sensor nodes or via communications with the processing subsystem. In one implementation, if two sensor nodes overlap in their sensing coverage, such as two cameras having image capture regions that overlap, the sensor nodes may partition certain functionality with the processing subsystem differently based on that knowledge. For example, if the traffic camera 108 and the traffic camera 114 cover the same intersection from slightly different perspectives and the traffic camera 108 has a more robust power supply and/or a cooler operating environment than the traffic camera 114, then the traffic camera 108 may send raw video data to the vehicle traffic monitoring system 104 while the traffic camera 114 enables its on-board lossless compression preprocessor, its noise cancellation preprocessor, and its temporal motion compensation preprocessor to take advantage of the beneficial energy management conditions. In this scenario, coordination of the overlapping cameras allows dynamic functionality partitioning decisions to be made in a cooperative manner among multiple sensor nodes.

Figure 2:
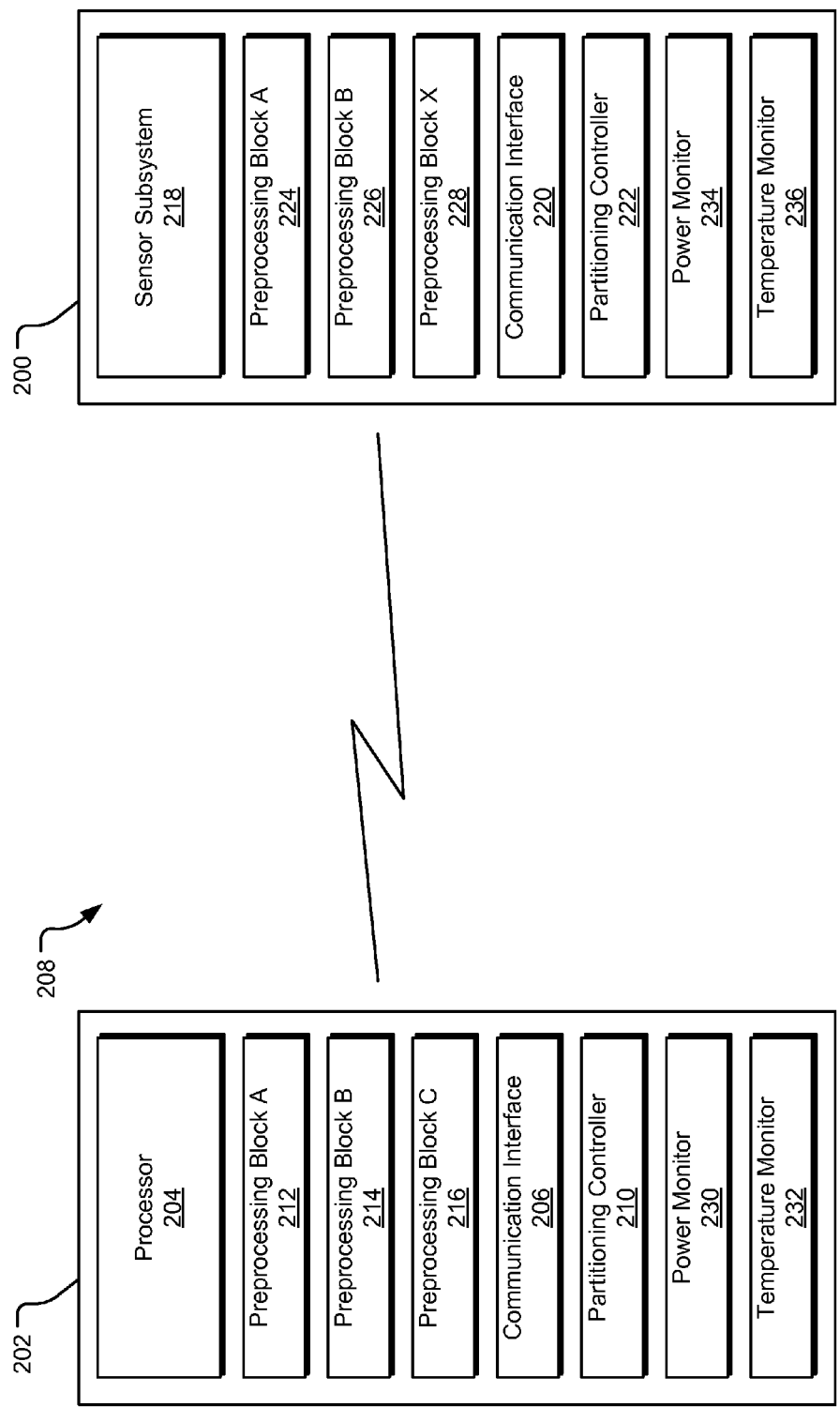
FIG. 2 illustrates an example sensor node and an example processing subsystem dynamically partitioning functionality based on energy management conditions.

FIG. 2 illustrates an example sensor node 200 and an example processing subsystem 202 dynamically partitioning functionality based on energy management conditions. The processing subsystem 202 is configured to receive a sensor data stream (e.g., video data) from the sensor node 200 and process it for broadcast, storage, editing, etc. The processing subsystem 202 includes a processor 204 (e.g., a CPU) responsible for the primary processing operations of the processing subsystem 202. The processing subsystem 202 also includes a communication interface 206 for communicating with the sensor node 200 and potentially other sensor nodes in a sensor network. The communication interface 206 receives and sends data from and to the sensor node 200 via a communications channel 208. As previously discussed, the communications channel 208 may be wired or wireless, depending on the configuration of the individual node. Further, the communications channel 208 may be implemented through a dedicated or shared communications channel (e.g., a wire or optical signal) or through a complex logical network, such as the Internet.

The processing subsystem 202 also includes a partitioning controller 210, which interacts with the sensor node 200 and the sensor data that the processing subsystem 202 receives to negotiate the appropriate dynamic partitioning of functionality between the processing subsystem 202 and a partitioning controller 222 of the sensor node 200. Further, the processing subsystem 202 includes multiple preprocessing blocks (e.g., preprocessing block A 212, preprocessing block B 214, and preprocessing block C 216), which are selected to preprocess the received sensor data before passing it to the processor 204. For example, if the processing subsystem 202 receives raw video data from the sensor node 200, the preprocessing block A 212 may compress the raw video data according to the H.264 standard before passing the compressed sensor data to the processor 204 for processing.

Preprocessing blocks and other operational blocks may consist of circuitry and potentially software/firmware to implement a specific preprocessing operation. In some cases, the preprocessing block may include circuitry in the form of a discrete or integrated accelerator, to allow the processor or a sensor subsystem to offload certain processing operations to a separate processing component. Example preprocessing blocks may include without limitation a graphics accelerator, a compression accelerator, a noise cancellation processor, etc. In one implementation, a sensor subsystem and one or more preprocessors are integrated into an SOC, which may also include a communication interface, a partitioning controller, and other integrated components.

In one implementation, the processing subsystem 202 also includes a power monitor block 230 and/or a temperature monitor block 232. Other energy monitoring blocks may be employed. The power monitor block 230 monitors the power supplied to the processing subsystem 202 and/or one or more of its components. If the available power fails to satisfy an acceptable operating range (e.g., relating to total battery charge remaining or the current draw) or is in a less desirable state (e.g., battery-powered instead of grid-powered), the power monitor block 230 can signal the partitioning controller 210 to change the functional partitioning between the processing subsystem 202 and one or more of the sensor nodes with which it is communicating, so that the processing subsystem 202 may reduce its power requirements. For example, if the total battery charge remaining falls below 25% of its full charge, the power monitor block 230 may signal the partitioning controller 210 to push some of the preprocessor functionality to the individual sensor nodes, rather than providing such functionality at the processing subsystem 202. In contrast, in better power conditions (e.g., the processing subsystem 202 is plugged into an electrical grid), the power monitor block 230 may signal the partitioning controller 210 to pull certain preprocessor functionality from one or more sensor nodes (e.g., disabling one or more of the sensor nodes' preprocessors) so that the processing subsystem 202 can provide this functionality (e.g., enabling its corresponding preprocessors).

The temperature monitor block 232 monitors the operating temperature of the processing subsystem 202 and/or one or more of its components. If the monitored temperatures fail to satisfy an acceptable operating range (e.g., approaching or exceeding a known temperature limit for the processing subsystem or components), the temperature monitor block 232 can signal the partitioning controller 210 to change the functional partitioning between the processing subsystem 202 and one or more of the sensor nodes with which it is communicating, so that the processing subsystem 202 may reduce its thermal generation to return to more acceptable thermal operation. For example, if the monitored temperature of the processing subsystem 202 approaches or exceeds a known limit of 200° F., the temperature monitor block 232 may signal the partitioning controller 210 to push some of the preprocessor functionality to the individual sensor nodes, rather than providing such functionality at the processing subsystem 202. In contrast, in better thermal conditions (e.g., the processing subsystem 202 operating at a cooler temperature), the temperature monitor block 232 may signal the partitioning controller 210 to pull certain preprocessor functionality from one or more sensor nodes (e.g., disabling one or more of the sensor nodes' preprocessors) so that the processing subsystem 202 can provide this functionality (e.g., enabling its corresponding preprocessors).

The sensor node 200 is configured to sense data in its environment, such as video data as a camera, audio data as a microphone, temperature data as a thermocouple, etc. The sensor node 200 contains a sensor subsystem 218 that may include an integrated interface to a discrete sensor (e.g., for a camera) or may include an integrated combination of the sensor and the sensor interface (e.g., for a photodiode). The sensor data detected by the sensor subsystem 218 may be communicated directly to the processor subsystem 202 via a communication interface 220 and the communications channel 208 without preprocessing or through one or more preprocessors prior to transmission to the processor subsystem 202 via the communication interface 220 and the communications channel 208.

The sensor node 200 includes multiple preprocessing blocks (e.g., preprocessing block A 224, preprocessing block B 226, and preprocessing block X 228). Note that two of the preprocessing blocks in the sensor node 200 have corresponding counterparts in the processing subsystem 202 (i.e., preprocessing block A 212 and preprocessing block B 214) and one of the preprocessing blocks is unique to the sensor node 200 (i.e., preprocessing block X 228), although other sensor nodes may also have their own preprocessing blocks X. Likewise, the preprocessing block C 216 in the processing subsystem 202 is unique to that subsystem. As previously discussed, the sensor node 200 also includes the partitioning controller 222.

In one implementation, the sensor node 200 also includes a power monitor block 234 and/or a temperature monitor block 236. Other energy monitoring blocks may also be employed. The power monitoring block 232 monitors the power supplied to the sensor node 200 and/or one or more of its components. If the available power fails to satisfy an acceptable operating range (e.g., relating to total battery charge remaining or the current draw) or is in a less desirable state (e.g., battery-powered instead of grid-powered), the power monitor block 234 can signal the partitioning controller 222 to change the functional partitioning between the sensor node 200 and the processing subsystem 202 with which it is communicating, so that the sensor node 200 may reduce its power requirements. For example, if the total battery charge remaining falls below 25% of its full charge, the power monitor block 234 may signal the partitioning controller 222 to push some of the preprocessor functionality to the processing subsystem 202, rather than providing such functionality at the sensor node 200. In contrast, in better power conditions (e.g., the sensor node 200 is plugged into an electrical grid), the power monitor block 234 may signal the partitioning controller 222 to pull certain preprocessor functionality from the processing subsystem 202 (e.g., disabling one or more of the processing subsystem's preprocessors) so that the sensor node 200 can provide this functionality (e.g., enabling its corresponding preprocessors).

The temperature monitor block 236 monitors the operating temperature of the sensor node 200 and/or one or more of its components. If the monitored temperatures fail to satisfy an acceptable operating range (e.g., approaching or exceeding a known temperature limit for the processing subsystem or components), the temperature monitor block 236 can signal the partitioning controller 222 to change the functional partitioning between the sensor node 200 and the processing subsystem 202 with which it is communicating, so that the sensor node 200 may reduce its thermal generation to return to more acceptable thermal operation. For example, if the monitored temperature of the sensor node 200 approaches or exceeds a known limit of 200° F., the temperature monitor block 236 may signal the partitioning controller 222 to push some of the preprocessor functionality to the processing subsystem 202, rather than providing such functionality at the sensor node 200. In contrast, in better thermal conditions (e.g., the sensor node 200 operating at a cooler temperature), the temperature monitor block 236 may signal the partitioning controller 222 to pull certain preprocessor functionality from the processing subsystem 202 (e.g., disabling one or more of the processing subsystem's preprocessors) so that the sensor node 200 can provide this functionality (e.g., enabling its corresponding preprocessors).

It should be understood that other monitors may be employed in both the sensor node 200 and the processing subsystem 202. For example, an energy generation monitor (e.g., to detect acoustic energy generated by a sensor node or processing subsystem), an energy consumption monitor (e.g., to detect energy consumed by a sensor node or processing subsystem from a battery, or an energy detection monitor (e.g., to detect sunlight received by the sensor node or processing subsystem) may be employed.

It should be understood that a one-to-one correspondence in preprocessors, as shown in FIG. 2, is only an example of the preprocessing configurations available to processing subsystems and sensor nodes. While some preprocessors in the sensor node may provide the same functionality as some preprocessors in the processing subsystem, there may also be preprocessors in the sensor node that are unique to the sensor node, as compared to the processing subsystem, and vice versa. Further, the functionality of certain preprocessors in the sensor node may overlap with the functionality of certain preprocessor in the processor subsystem, and vice versa. For example, a preprocessor in the processor subsystem may provide the functionality of two preprocessors or two and half preprocessors in the sensor node, or vice versa.

Figure 3:
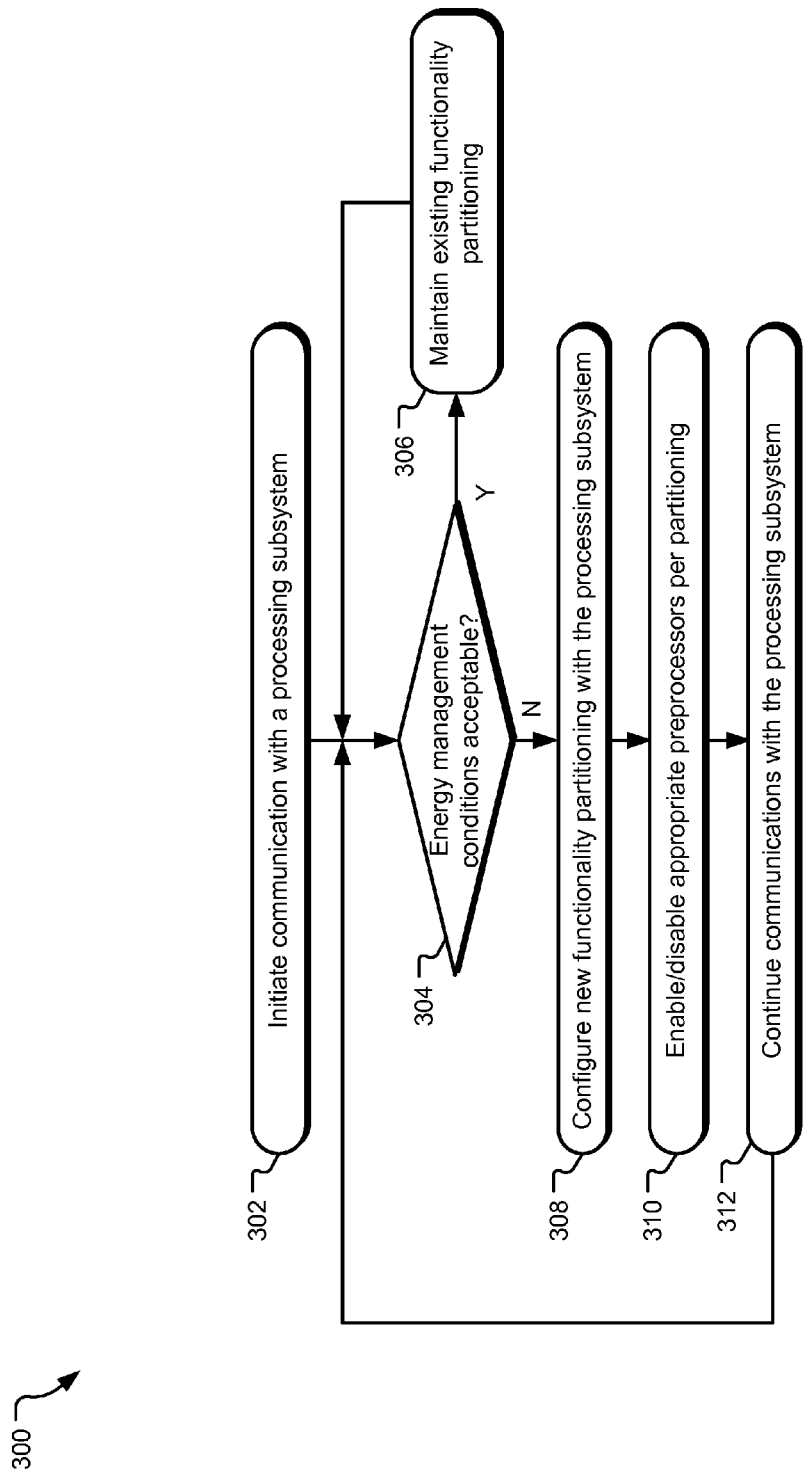
FIG. 3 illustrates example operations for dynamically partitioning functionality from the perspective of a sensor node.

FIG. 3 illustrates operations 300 for dynamically partitioning functionality from the perspective of a sensor node. A communications operation 302 initiates communications with a processing subsystem. As previously discussed, such communications may be accomplished via a variety of communications channels. A monitoring operation 304 monitors the energy management conditions of the sensor node. If the energy management conditions of the sensor node are acceptable (e.g., within determined acceptable operating ranges or in an acceptable defined state for the current functionality partitioning, such as grid-powered) for the current operation of the sensor node and the processing subsystem, the existing partitioning of functionality is maintained between the sensor node and the processing subsystem by operation 306, and communication continues.

The energy management conditions of the sensor node are periodically re-evaluated by the monitoring operation 304. If the energy management conditions of the sensor node become inadequate (e.g., dropping below a defined power draw threshold or a defined remaining charge threshold and/or rising above a defined temperature threshold) for the current operation of the sensor node and the processing subsystem, a configuring operation 308 reallocates functionality between the sensor node and the processing subsystem (e.g., to repartition the overall system functionality). Responsive to the configuring operation 308, a repartitioning operation 310 enables or disables select preprocessors in the sensor node in accordance with the new functionality partitioning. A communications operation 312 continues the communication of sensor data between the sensor node and the processing subsystem, subject to the new functionality partitioning, and the new energy management conditions of the sensor node are periodically re-evaluated by the communications monitoring operation 304. After each repartitioning operation 310, the sensor data stream is changed in some way (e.g., to a different type or level of compression, to a different level of noise cancellation, etc.). In one perspective, the original sensor data stream terminates and a second sensor data stream commences.

For example, if the energy management conditions of the sensor node improve to provide additional energy or cooler operating temperatures, the sensor node may elect to send compressed and cleaned video data to the processing subsystem to take advantage of the additional energy or cooler operating conditions. In such a case, the processing subsystem may be instructed to (or may automatically) skip compression and cleaning of the received sensor data (which could be performed by one of its own preprocessor blocks). In contrast, if the energy management conditions of the sensor node degrade to further limit or diminish sensor node performance, the sensor node may elect to send only raw video data to accommodate the more challenging energy management conditions. Such accommodations may be negotiated back and forth between the sensor node and the processing subsystem or simply imposed by instruction by one or the other. Accordingly, the new functionality partitioning adjusts the energy management conditions of the sensor node and/or utilization between the sensor node and the processing subsystem.

Figure 4:
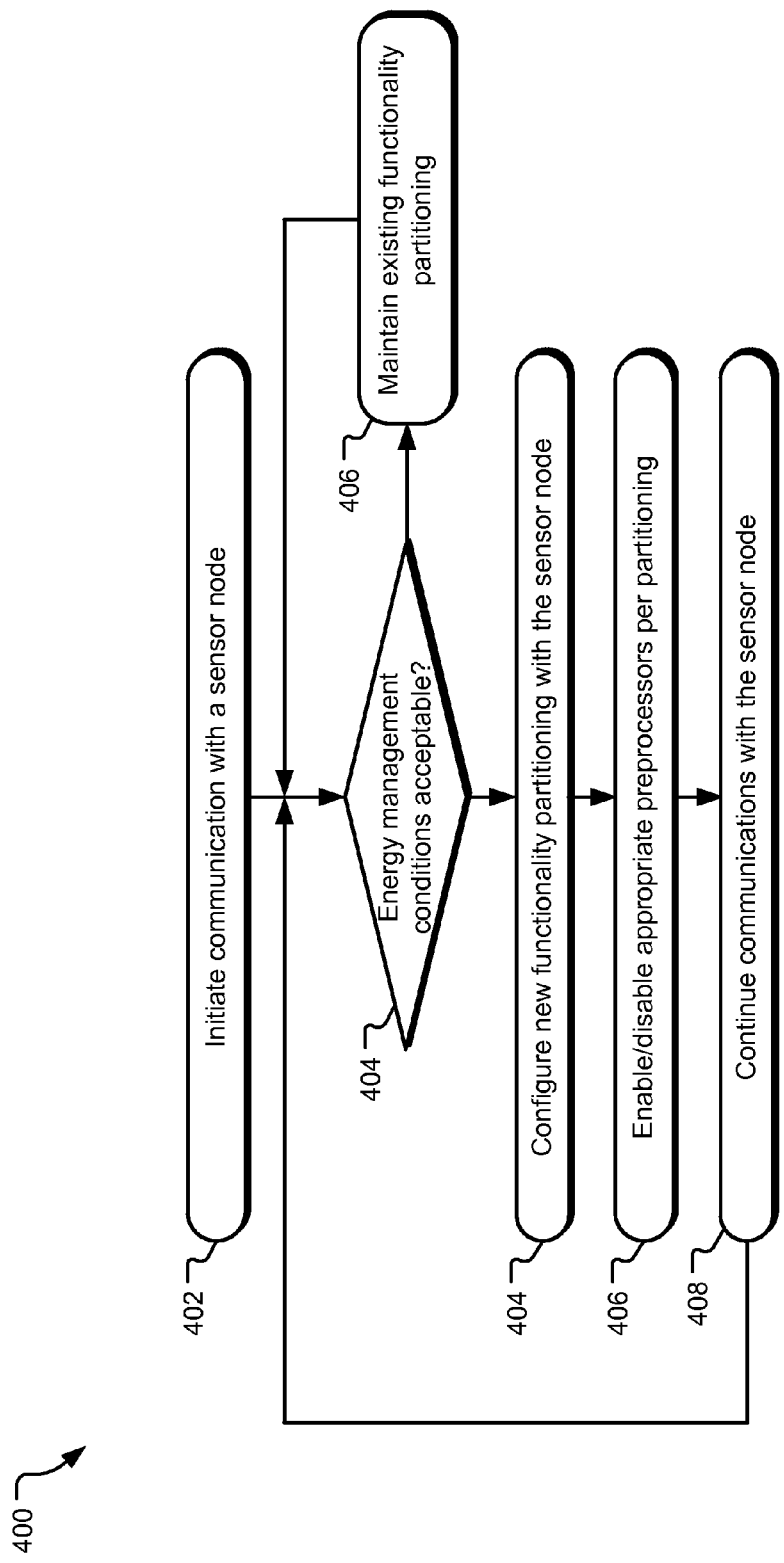
FIG. 4 illustrates example operations for dynamically partitioning functionality from the perspective of a processing subsystem.

FIG. 4 illustrates operations 400 for dynamically partitioning functionality from the perspective of a processing subsystem. A communications operation 402 initiates communications with a sensor node. As previously discussed, such communications may be accomplished via a variety of communications channels. A monitoring operation 404 monitors the energy management conditions of the processing subsystem. If the energy management conditions of the processing subsystem are acceptable (e.g., within determined acceptable operating ranges or in an acceptable defined state for the current functionality partitioning, such as grid-powered) for the current operation of the processing subsystem and the sensor node, the existing partitioning of functionality is maintained between the processing subsystem and the sensor node by operation 406, and communication continues.

The energy management conditions of the processing subsystem are periodically re-evaluated by the monitoring operation 404. If the energy management conditions of the processing subsystem become inadequate (e.g., dropping below a defined power draw threshold or a defined remaining charge threshold and/or rising above a defined temperature threshold) for the current operation of the processing subsystem and the sensor node, a configuring operation 408 reallocates functionality between the processing subsystem and the sensor node (e.g., to repartition the overall system functionality). Responsive to the configuring operation 408, a repartitioning operation 410 enables or disables select preprocessors in the processing subsystem in accordance with the new functionality partitioning. A communications operation 412 continues the communication of sensor data between the processing subsystem and the sensor node, subject to the new functionality partitioning, and the new energy management conditions of the processing subsystem are periodically re-evaluated by the communications monitoring operation 404. After each repartitioning operation 410, the sensor data stream is changed in some way (e.g., to a different type or level of compression, to a different level of noise cancellation, etc.). In one perspective, the original sensor data stream terminates and a second sensor data stream commences.

For example, if the energy management conditions of the processing subsystem improve to provide additional power or cooler operating temperatures, the processing subsystem may instruct the sensor node to send uncompressed sensor data so that the processor subsystem can take advantage of its improved energy management conditions and perform the preprocessing itself. In such a case, the sensor node may be instructed to (or may automatically) disable compression of the detected sensor data based on one of its own preprocessor blocks. In contrast, if the energy management conditions degrade to further limit or diminish processing subsystem performance, the processing subsystem may instruct the sensor node to send fewer frames per second or perform spatial image compression or temporal motion compensation via one of the sensor node's preprocessors to accommodate the more challenging energy management conditions. Such accommodations may be negotiated back and forth between the processing subsystem and the sensor node or simply imposed by instruction by one or the other. Accordingly, the new functionality partitioning adjusts the communications requirements and/or utilization between the processing subsystem and the sensor node.

Figure 5:
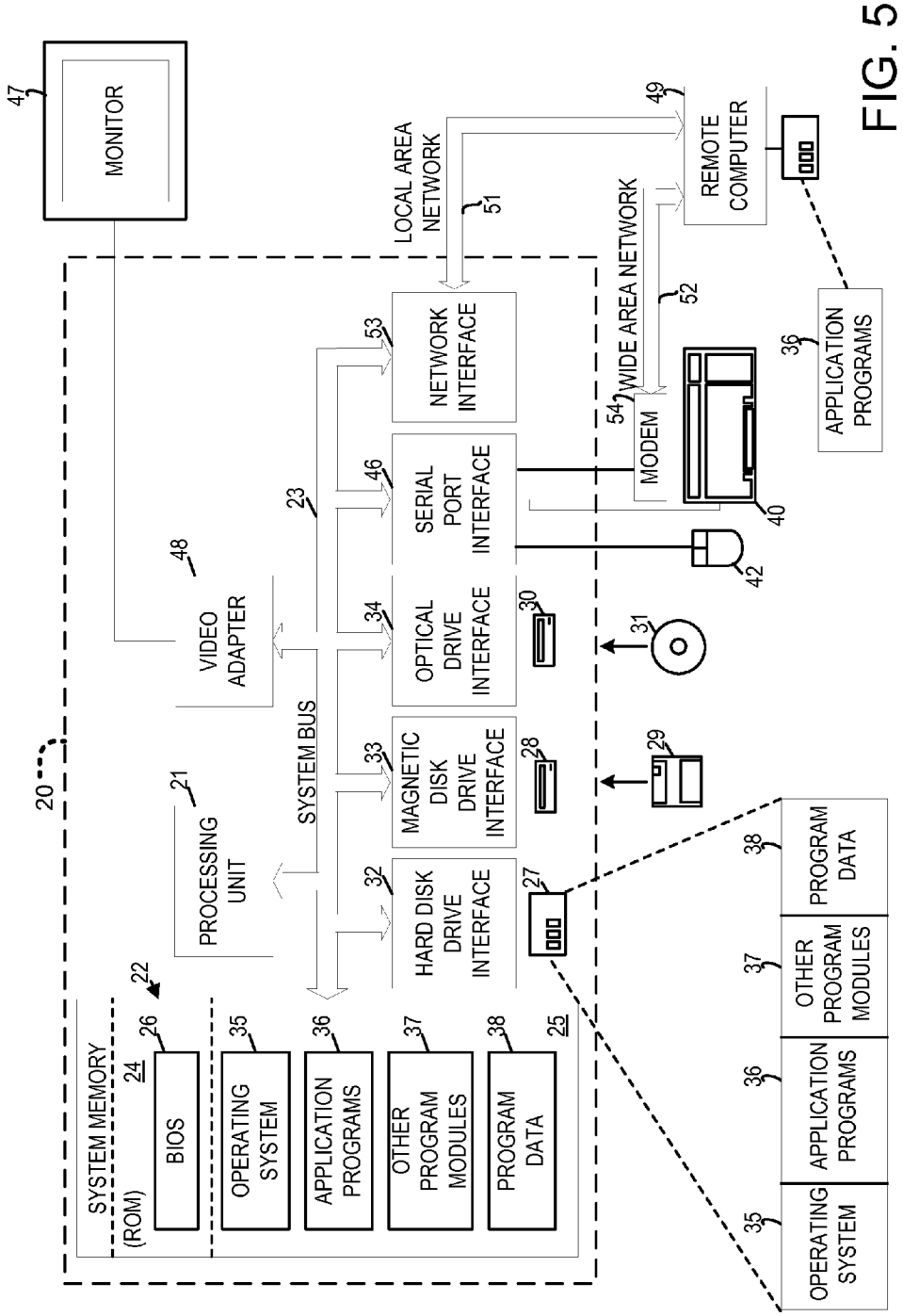
FIG. 5 illustrates an example system that may be useful in implementing the described technology.

FIG. 5 illustrates an example system that may be useful in implementing the described technology. The example hardware and operating environment of FIG. 5 for implementing the described technology includes a computing device, such as general purpose computing device in the form of a gaming console or computer 20, a mobile telephone, a personal data assistant (PDA), a set top box, or other type of computing device. One or more portions of the example system may be implemented in the form of a system-on-a-chip (SOC). In the implementation of FIG. 5, for example, the computer 20 includes a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, a joystick, a game pad, a gesture detector, a touch screen, a satellite dish, a scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 5. The logical connections depicted in FIG. 5 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are example and other means of and communications devices for establishing a communications link between the computers may be used.

In an example implementation, software or firmware instructions for controlling sensor subsystem circuitry, pre-processor circuitry, a communication interface, a partitioning controller, a power monitor, a temperature monitor, an energy monitor, and other hardware/software blocks stored in memory 22 and/or storage devices 29 or 31 and processed by the processing unit 21. The sensor data, detected energy management condition parameters, and other data may be stored in memory 22 and/or storage devices 29 or 31 as persistent datastores.

Figure 6:
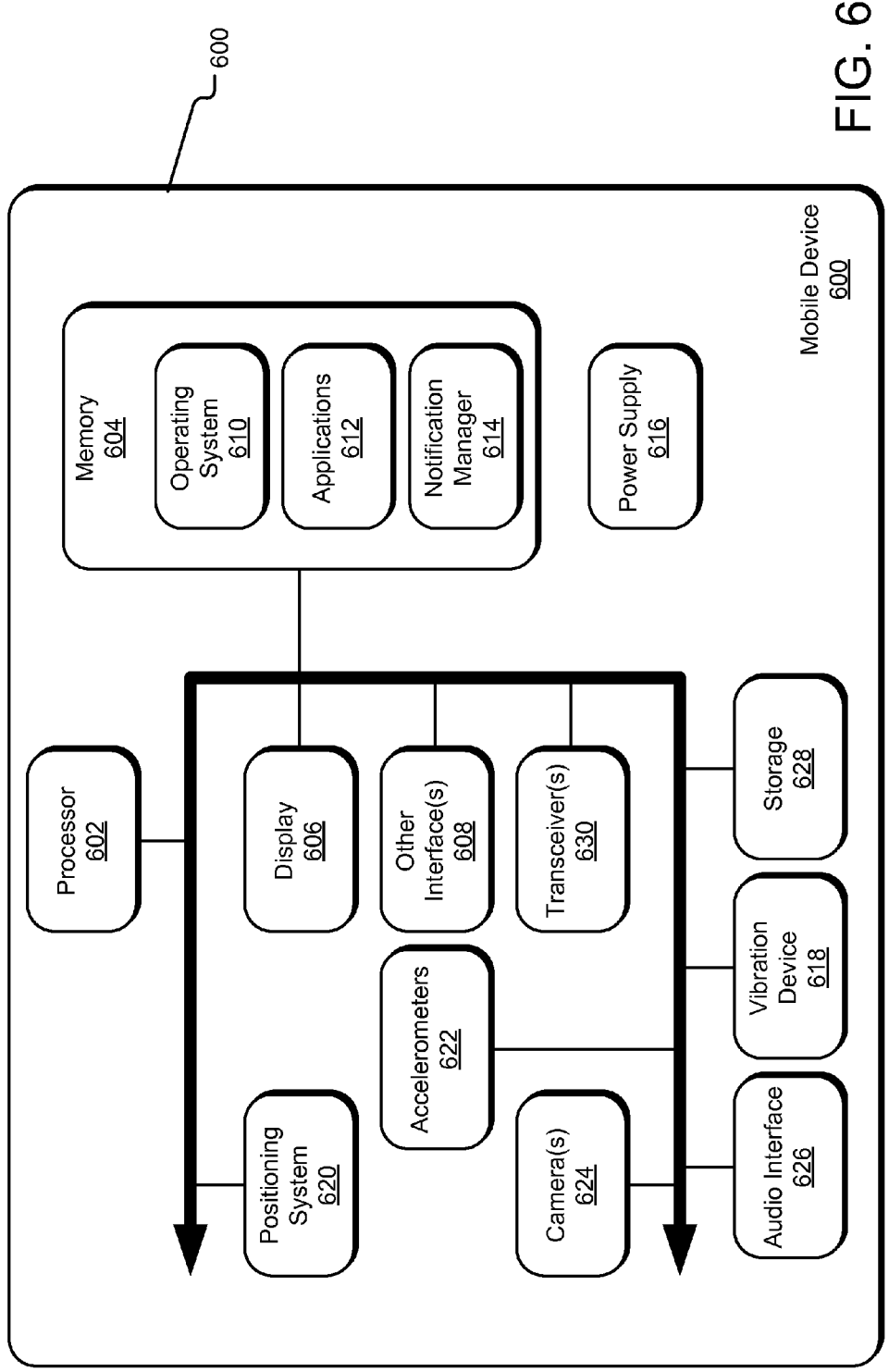
FIG. 6 illustrates another example sensor node that may be useful in implementing the described technology.

FIG. 6 illustrates another example sensor node (labeled as a mobile sensor 600) that may be useful in implementing the described technology. The mobile sensor 600 includes a processor 602, a memory 604, a display 606 (e.g., a touchscreen display), and other interfaces 608 (e.g., a keyboard, a camera, a microphone, etc.), although sensor nodes may have more or fewer components. For example, an emissions monitoring sensor may be positioned in an industrial emissions vent and therefore have no need for user input and output interfaces. The memory 604 generally includes both volatile memory (e.g., RAM) and non-volatile memory (e.g., flash memory). An operating system 610, such as the Microsoft Windows® Phone 8 operating system, may reside in the memory 604 and is executed by the processor 602, although it should be understood that other operating systems may be employed.

One or more application programs 612 may be loaded in the memory 604 and executed on the operating system 610 by the processor 602. Examples of application programs 612 include without limitation applications for use with one or more preprocessor blocks, etc. The mobile sensor 600 includes a power supply 616, which is powered by one or more batteries or other power sources and which provides power to other components of the mobile sensor 600. The power supply 616 may also be connected to an external power source that overrides or recharges the built-in batteries or other power sources.

The mobile sensor 600 includes one or more communication transceivers 630 to provide network connectivity (e.g., mobile phone network, Wi-Fi®, BlueTooth®, Ethernet, etc.). The mobile sensor 600 may also include various other components, such as a positioning system 620 (e.g., a global positioning satellite transceiver), one or more accelerometers 622, one or more cameras 624, an audio interface 626 (e.g., a microphone, an audio amplifier and speaker and/or audio jack), and additional storage 628. Other configurations may also be employed.

In an example implementation, software or firmware instructions for controlling sensor subsystem circuitry, preprocessor circuitry, a communication interface, a partitioning controller, a power monitor, a temperature monitor, an energy monitor, and other hardware/software blocks may be embodied by instructions stored in memory 604 and/or storage devices 628 and processed by the processor 602. The sensor data, the detected energy management condition parameters, and other data may be stored in memory 604 and/or storage devices 628 as persistent datastores. One or more portions of the example sensor node may be implemented in the form of a system-on-a-chip (SOC).

Some embodiments may comprise an article of manufacture. An article of manufacture may comprise a tangible storage medium to store logic. Examples of a tangible storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

The implementations described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A system comprising:
   one or more processors; and
   one or more computer-readable media storing instructions that, when executed on the one or more processors, cause the one or more processors to:
   receive, from a sensor node, first processed sensor data via a communications channel;
   receive, from the sensor node, an indication to change from a first processing allocation to a second processing allocation based on a detected energy management condition, the second processing allocation for processing sensor data at the system rather than processing the sensor data at the sensor node;
   configure, based at least in part on the indication, the second processing allocation;
   subsequent to configuring the second processing allocation, receive, from the sensor node, the sensor data; and
   process, based at least in part on the second processing allocation, the sensor data to generate second processed sensor data.

2. The system of claim 1, wherein the sensor data includes raw data and the first processed sensor data and the second processed sensor data include compressed data.

3. The system of claim 1, wherein before receiving the indication to change from the first processing allocation to the second processing allocation, the instructions further cause the one or more processors to:
   detect the detected energy management condition; and
   send, to the sensor node, a signal that causes the sensor node to disable a preprocessing block that is used to process the sensor data.

4. The system of claim 1, the system further comprising a preprocessing block, and wherein the instructions further cause the one or more processors to:
   enable, based at least in part on receiving the indication, the preprocessing block to accommodate a change in the detected energy management condition.

5. The system of claim 4, wherein processing the sensor data comprises processing the sensor data using the preprocessing block to generate the second processed sensor data.

6. The system of claim 1, wherein the instructions further cause the one or more processors to:
   receive, in response to the detected energy management condition, third processed sensor data from an additional sensor node, wherein the sensor node and the additional sensor node include overlapping sensing coverage.

7. The system of claim 1, wherein the detected energy management condition comprises at least one of power consumption, energy consumption, thermal generation, or energy generation.

8. A device comprising:
   one or more processors; and
   one or more computer-readable media storing instructions that, when executed on the one or more processors, cause the one or more processors to:
   process first sensor data to generate processed sensor data;
   transmit the processed sensor data to a processing subsystem;
   detect an energy management condition;
   based at least in part on the energy management condition, transmit, to the processing subsystem, an indication to change from a first processing allocation to a second processing allocation; and
   transmit second sensor data to the processing subsystem for processing based at least in part on the second processing allocation rather than processing the second sensor data at the device.

9. The device of claim 8, wherein the first sensor data and the second sensor data include raw data and the processed sensor data includes compressed data.

10. The device of claim 8, the device further comprising a preprocessing block, and wherein the instructions further cause the one or more processors to:
    disable the preprocessing block to accommodate for a change in the energy management condition.

11. The device of claim 10, wherein processing the first sensor data comprises processing the first sensor data using the preprocessing block to generate the processed sensor data.

12. The device of claim 8, wherein the energy management condition comprises at least one of power consumption, energy consumption, thermal generation, or energy generation.

13. The device of claim 8, wherein transmitting the second sensor data to the processing subsystem causes the processing subsystem to process the second sensor data.

14. A system comprising:
    a sensor node configured to:
    process first sensor data to generate first processed sensor data;
    transmit the first processed sensor data to a processing subsystem;
    detect an energy management condition;
    based at least in part on the energy management condition, transmit, to the processing subsystem, an indication to change from a first processing allocation to a second processing allocation; and
    transmit second sensor data to the processing subsystem for processing based at least in part on the second processing allocation rather than processing the second sensor data at the sensor node; and the processing subsystem configured to:
receive the first processed sensor data from the sensor node;
receive the indication from the sensor node;
receive the second sensor data from the sensor node; and
process the second sensor data based at least in part on the second processing allocation to generate second processed sensor data.

15. The system of claim 14, wherein the processing of the first sensor data and the second sensor data comprises at least one of noise canceling, smoothing, or spatial normalization, and the first processing allocation is changed to the second processing allocation to decrease power consumption or thermal generation of the sensor node.

16. The system of claim 14, wherein the sensor node is further configured to disable a preprocessor block for processing the second sensor data and the processing subsystem is further configured to enable a corresponding preprocessor block for processing the second sensor data.

17. The system of claim 14, wherein the sensor node is further configured to capture sensor data that comprises both the first sensor data and the second sensor data.

18. The system of claim 14, wherein the first sensor data and the second sensor data include raw data, and wherein the first processed sensor data and the second processed sensor data include compressed data.

19. The system of claim 14, wherein the energy management condition comprises at least one of power consumption, energy consumption, thermal generation, or energy generation.

20. The system of claim 14, further comprising an additional sensor node configured to send, to the processing subsystem, third processed sensor data in response to the energy management condition, wherein the sensor node and the additional sensor node include overlapping sensing coverage.

\* \* \* \* \*